US011413513B2

(12) United States Patent
Penrod et al.

(10) Patent No.: US 11,413,513 B2
(45) Date of Patent: Aug. 16, 2022

(54) APPARATUS AND METHOD FOR IMPROVING BATTING TECHNIQUE

(71) Applicant: ZvTee, Seaford, DE (US)

(72) Inventors: Daniel Allen Penrod, Seaford, DE (US); Shawn Eisemann, Bishopville, MD (US)

(73) Assignee: ZVTEE, Seaford, DE (US)

( * ) Notice: Subject to any disclaimer, the term of this patent is extended or adjusted under 35 U.S.C. 154(b) by 0 days.

(21) Appl. No.: 17/248,752

(22) Filed: Feb. 5, 2021

(65) Prior Publication Data
US 2021/0197049 A1 Jul. 1, 2021

Related U.S. Application Data

(60) Provisional application No. 62/952,888, filed on Dec. 23, 2019.

(51) Int. Cl.
A63B 71/00 (2006.01)
A63B 69/00 (2006.01)
A63B 71/06 (2006.01)
A63B 69/36 (2006.01)
A63B 102/18 (2015.01)

(52) U.S. Cl.
CPC ...... A63B 69/0002 (2013.01); A63B 69/0075 (2013.01); A63B 69/3623 (2013.01); A63B 71/0622 (2013.01); A63B 2069/0008 (2013.01); A63B 2102/18 (2015.10); A63B 2102/182 (2015.10); A63B 2214/00 (2020.08); A63B 2225/74 (2020.08)

(58) Field of Classification Search
CPC .............. A63B 69/002; A63B 69/0075; A63B 2069/0008; A63B 2225/74; A63B 71/0622; A63B 2102/18; A63B 2102/182

USPC ................................................ 473/417, 422
See application file for complete search history.

(56) References Cited

U.S. PATENT DOCUMENTS

| 4,834,375 | A * | 5/1989 | Elstein | A63B 24/00 473/417 |
| 7,169,067 | B2 * | 1/2007 | Town | A63B 69/0002 473/417 |
| 7,887,441 | B1 * | 2/2011 | Archer | A63B 69/0053 473/417 |
| 7,892,116 | B2 * | 2/2011 | Kellogg | A63B 69/0002 473/451 |
| 10,549,166 | B1 * | 2/2020 | Mueller | A63B 69/0002 473/417 |

(Continued)

FOREIGN PATENT DOCUMENTS

WO    WO-2016168793 A1 * 10/2016 ......... A63B 69/0075

Primary Examiner — Mitra Aryanpour
(74) Attorney, Agent, or Firm — Miles & Stockbridge P.C.

(57) ABSTRACT

An apparatus and method for improving batter technique is herein disclosed. In certain embodiments, the apparatus is a batting tee that includes a base, a vertical shaft assembly that is mounted to the base and has a ball support at an uppermost end thereof, a light source housed within the vertical shaft assembly and designed to illuminate an area proximate the ball support, and a controller for activating the light source. In certain embodiments, the method includes providing the above-described batting tee, placing a ball on the ball support of the tee, hitting the ball off the ball support to activate the light source, and keeping eye contact with the illuminated area.

9 Claims, 5 Drawing Sheets

(56) References Cited

U.S. PATENT DOCUMENTS

| | | | | |
|---|---|---|---|---|
| 11,027,185 B1* | 6/2021 | LoDuca | ............. | A63B 69/0075 |
| | | | | 473/417 |
| 2018/0043230 A1* | 2/2018 | Gutierrez | ............. | B29C 45/006 |
| | | | | 473/417 |
| 2018/0236334 A1* | 8/2018 | Loduca | ............. | A63B 69/0002 |
| | | | | 473/417 |
| 2019/0388753 A1* | 12/2019 | Paulson | ............. | A63B 69/0075 |
| | | | | 473/417 |
| 2021/0197049 A1* | 7/2021 | Penrod | ............... | A63B 69/0002 |
| | | | | 473/417 |
| 2021/0197055 A1* | 7/2021 | Hunt | ................. | A63B 69/0002 |
| | | | | 473/417 |

* cited by examiner

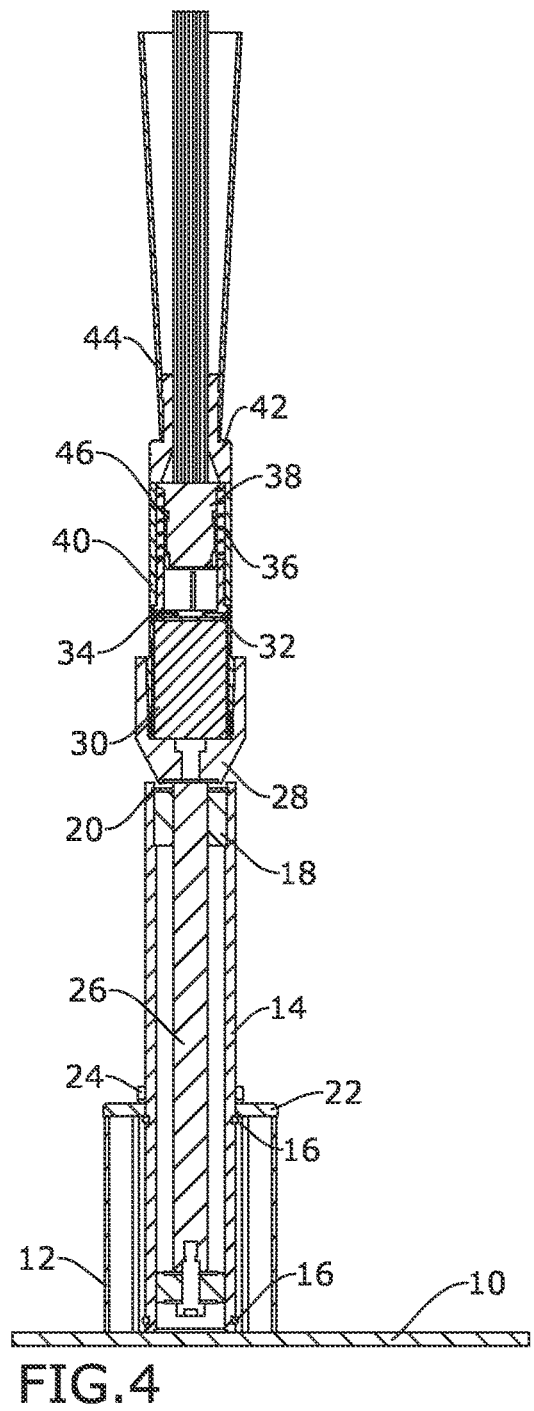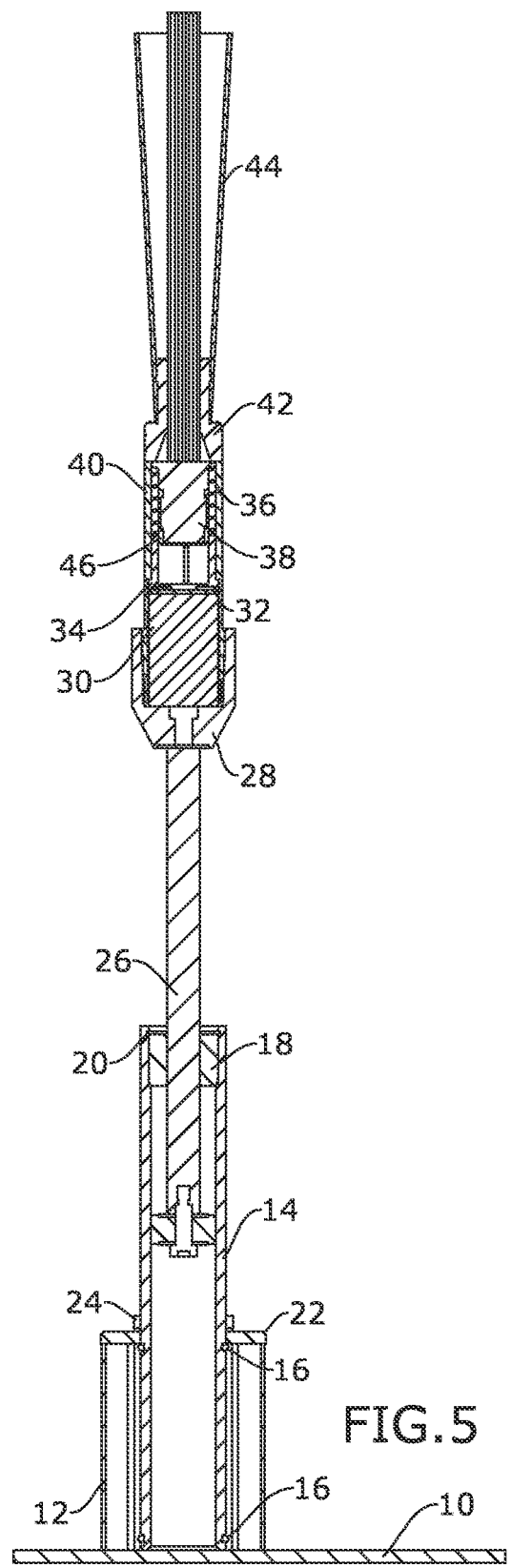

APPARATUS AND METHOD FOR IMPROVING BATTING TECHNIQUE

CROSS-REFERENCE TO RELATED APPLICATION

This application claims the benefit of priority of U.S. provisional application No. 62/952,888, filed Dec. 23, 2019, the contents of which are herein incorporated by reference.

BACKGROUND OF THE INVENTION

The present invention relates to hitting aids for baseball, softball, and the like. More specifically, the present invention relates to a hitting tee for such sports.

The batting or hitting tee is a typically rubber stand that is used to support a stationary baseball so that the player can swing at it, without need for a pitcher. The tee is very useful when a batter needs to adjust his or her swing. Players have also been known to use a knotted hanging heavy rope for this purpose, although the tee has the advantage that the batter can swing at an actual baseball.

In his autobiography, Charlie "Metro" Moreskonich claims to have invented the batting tee around 1935 by using pieces of tubing that were lying around during his off-seasons spent working in the coal mines of western Pennsylvania. Though it was never patented by Metro, the batting tee quickly came into widespread use. Today, it is as ubiquitous to every level of the games of baseball and softball as a glove and bat.

Baseball and softball players tend to not watch the ball to bat contact point, but rather tend to pull their heads away from that point as the ball begins to travel and they finish their swings. All batting tees are design to hold a ball in various ways, which is fine for placing a stationary ball on a stationary, non-interactive environment. However, this process has no mechanical or electrical means of providing interactive feedback, which hold the batter accountable for watching the contact point.

Until the invention detailed in the present application, these and other problems in the prior art went either unnoticed or unsolved by those skilled in the art. The present invention provides an improved batting tee which performs multiple functions without sacrificing portability features, designs, style, or affordability.

SUMMARY OF THE INVENTION

In one aspect of the present invention, a batting tee includes a base, a vertical shaft assembly mounted to the base and having a ball support at an uppermost end, a light source housed within the vertical shaft assembly and configured to illuminate an area proximate the ball support, and a controller for activating the light source.

In another aspect of the present invention, a method for improving batting technique includes the steps of (1) providing a batting tee that includes a base, a vertical shaft assembly mounted to the base and having a ball support at an uppermost end, a light source housed within the vertical shaft and configured to illuminate an area proximate the ball support; and a controller for activating the light source; (2) placing a ball on the ball support of the tee; (3) hitting the ball off the ball support to activate the light source; and (4) keeping eye contact with the illuminated area.

These and other features, aspects and advantages of the present invention will become better understood with reference to the following drawings, description, and claims.

BRIEF DESCRIPTION OF THE DRAWINGS

FIG. 4 is a section view of the embodiment of the present invention, taken along line 4-4 in FIG. 2, showing the embodiment in a lowered position;

FIG. 5 is a section view of the embodiment of the present invention, similar to FIG. 4, and showing a height adjustment feature to a raised position of the embodiment;

DETAILED DESCRIPTION OF THE INVENTION

Figure 1:
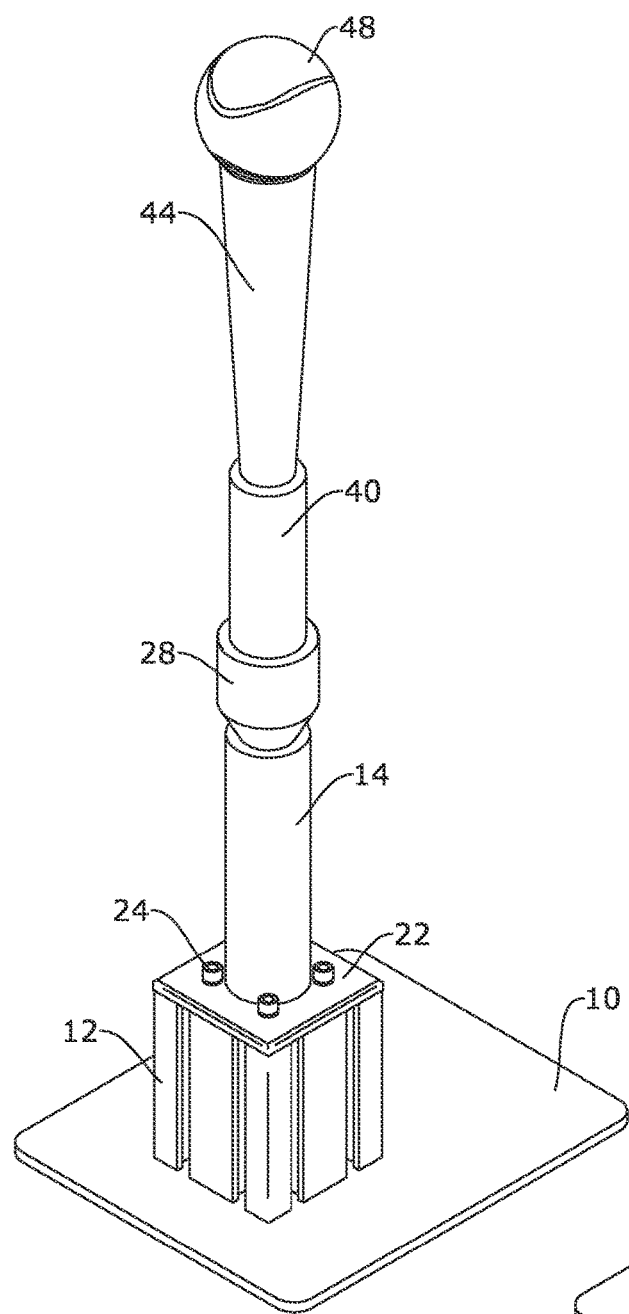
FIG. 1 is a perspective view of an embodiment of the present invention, shown in use with a ball.
Figure 2:
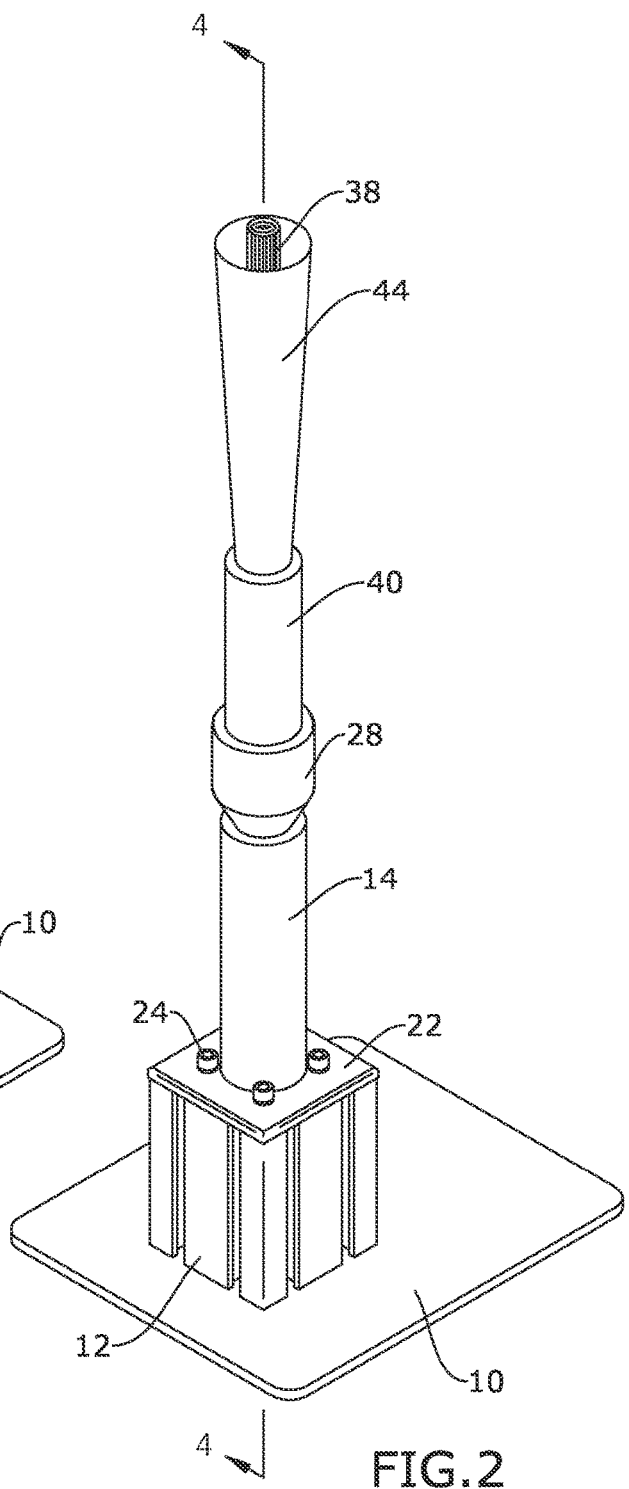
FIG. 2 is a perspective view of the embodiment of the present invention, with the ball removed to show a light source of the present invention.

The following detailed description is of the best currently contemplated modes of carrying out exemplary embodiments of the invention. The description is not to be taken in a limiting sense but is made merely for the purpose of illustrating the general principles of the invention, since the scope of the invention is best defined by the appended claims.

Broadly, one embodiment of the present invention is an improved batting tee disclosed herein which avoids the disadvantages of prior devices while affording additional structural and operating advantages. The batting tee may comprise a base, a vertical shaft assembly mounted to the base and having a ball support at an uppermost end, a light source housed within the vertical shaft and configured to illuminate an area proximate the ball support, and a controller for activating the light source. In certain embodiments, the batting tee controller activates the light source when a ball is displaced from the ball support. In certain embodiments, the light source comprises a plurality of random colors selectable therefrom.

Further, a method for improving and teaching batting technique is disclosed. The method generally comprises providing a batting tee comprising a base, a vertical shaft assembly mounted to the base and having a ball support at an uppermost end, a light source housed within the vertical shaft and configured to illuminate an area proximate the ball support, and a controller for activating the light source when a ball is displaced from the ball support, then placing a ball on the ball support of the tee, and hitting the ball off the ball support to activate the light source. The hitter is more inclined to maintain eye contact with the illuminated area which accomplishes keeping his/her head down through the hitting process. In certain embodiments, the method may further include the light source illuminating in one or more random colors.

While this invention is susceptible of embodiments in many different forms, there is shown in the drawings and will herein be described in detail at least one preferred embodiment of the present invention with the understanding that the present disclosure is to be considered as an exemplification of the principles of the present invention and is not intended to limit the broad aspect of the present invention to any of the specific embodiments illustrated.

The batting tee of the present invention includes fiber optic strands/bundle inside the tee topper/cone to carry a random light color directly at the point of contact. The batting tee of the present invention has the only mechanical/electrical structure with a plurality of random light source colors designed to interact with the batter at the point of contact. The batting tee apparatus of the present invention is designed such that batters and their coaches can make watching the point of contact via a random colored flash of light through the transmission via fiber optic stands bundled together part of the training process. If the batter doesn't watch the point of contact, he/she will not see the light flash. From there, the coach can quiz the batter on what color he/she saw. The feedback is instant, random, and interactive.

Referring to FIGS. 1-8, there is illustrated a batting tee and its numerous components. The described embodiment of a batting tee is for use in baseball or softball. In accordance with the present invention, a batting tee (FIG. 1) is embodied with a light source 38, which may be embodied as a fiber optic bundle connected to a mounting structure, that emits random colors after a ball 48, such as a softball or baseball, is hit off the top of the batting tee. Advantageously, that light source illuminates within the immediate area of the ball 48 loaded on the batting tee immediately after the ball 48 is hit off the top of the tee for a programmable time period, with FIGS. 6-8 demonstrating these described steps. The entire tee, as shown in FIGS. 1-8, is designed with multiple areas of engineering to not only emit the light source immediately, but to also keep the tee stable after impact.

Referring now to FIGS. 1-5, an offset base 10 of the tee is provided. In certain embodiments, the offset base may be made and machined from hot rolled steel with the edges machined with a generous radius in thought to protect from injury. The base 10, in certain embodiments, is powder coated for longevity of its brilliance. The offset design, as shown, for example, in FIGS. 4 and 5, is maximized for stability after a batter impacts the ball 48, with the longer end (i.e., the right side of the base in FIG. 4) of the base 10 being pointed toward the pitcher's side (i.e., the side of the base where the batter's follow through after contacting the ball 48 occurs). The offset enables the tee to remain in place after impact and not tip over, which is the purpose of the design.

Figure 3:
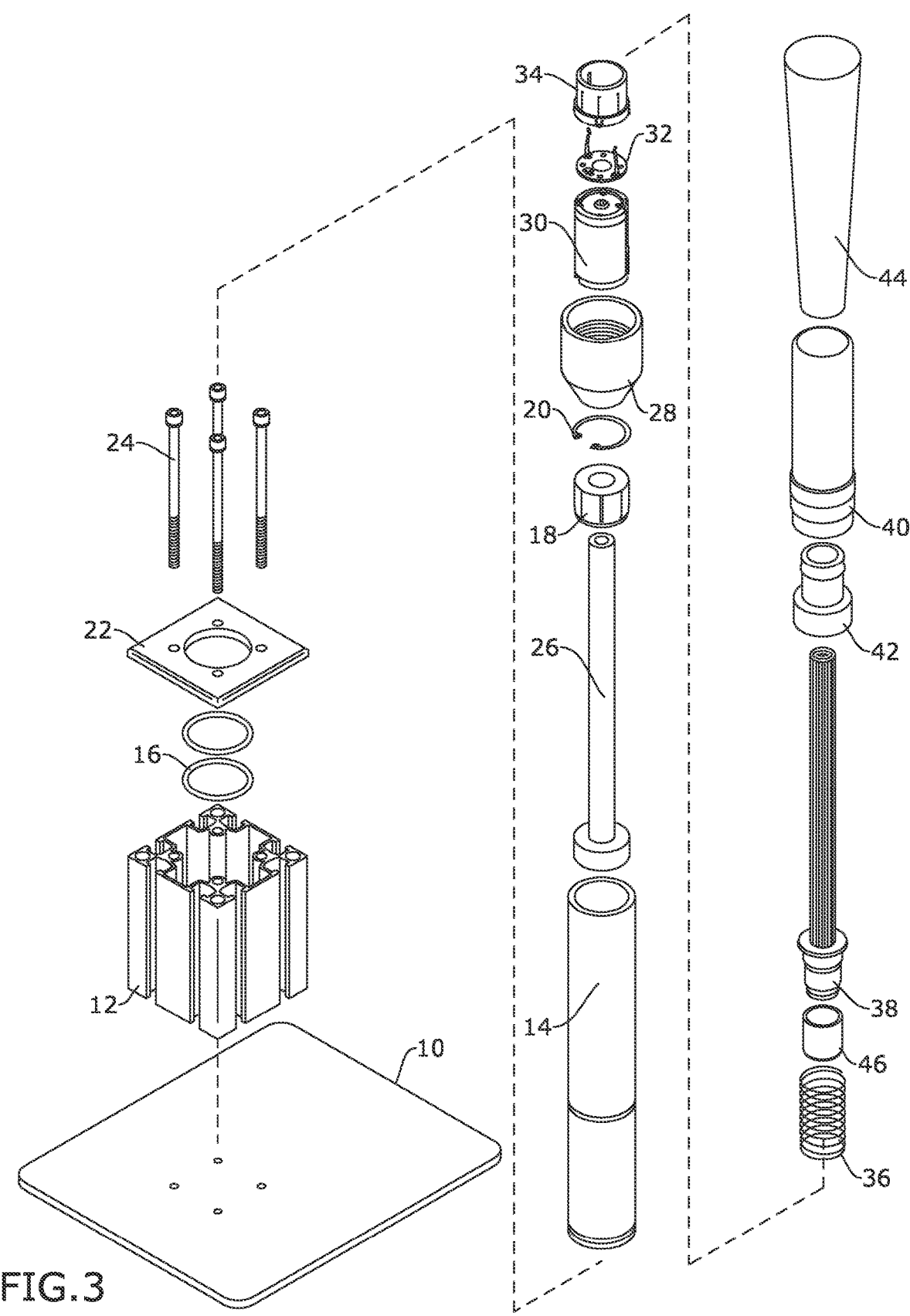
FIG. 3 is an exploded view of the embodiment of the present invention.
Figure 6:
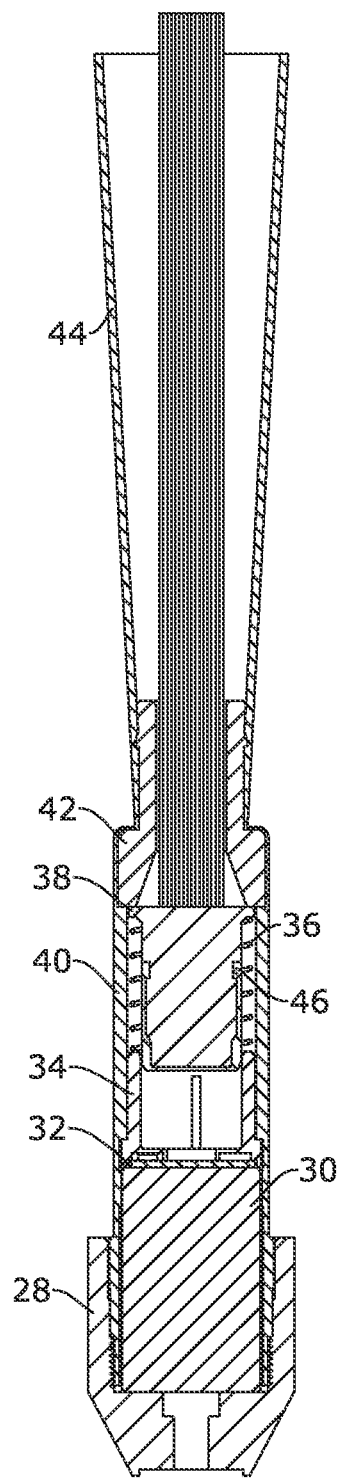
FIG. 6 is a section view of the embodiment of the present invention, taken along the same line as FIG. 4, showing the light source in a raised position.

Making further reference to FIGS. 1-5, a slotted base post 12 is designed for additional accessories that can be added in the future. As shown in FIG. 1, the base post 12 forms a bottom of a vertical shaft assembly that terminates at an upper end with a ball support (e.g., a topper 44). The inside of the slotted base acts as a mount for the adjustable height mechanism (AHM) tube 14. This design coupled with the AHM tube 14 offer another designed feature to maximize stability. As shown in FIGS. 4 and 5, two O-rings 16 are used to help dampen the impact and act as shock absorbers to increase and maintain stability after the tee is impacted. In use, the O-rings sit in grooves formed in the AHM tube 14. A cover 22, which may be formed from aluminum, is designed to capture, but allow for the AHM tube 14 to be independent and free to move slightly during impact. As shown in FIGS. 3-5, bolts 24 and lock washer are used to secure the cover 22 to the base post 12.

As shown in FIGS. 4 and 5, the AHM tube 14 is adjustable via a second shaft 26, which may be formed from aluminum, and internally with two individual and independent disks (which may be formed from felt, are disposed at a bottom of the second shaft 26 and engage with inner walls of the AHM tube 14 to create a pressure fit) designed to maintain stability at its static position, and also during impact to withstand movement in an upward or downward direction. To further achieve this end, a shaft guide 18 is provided at an upper end of the AHM tube 14 and is secured in place by a snap guide 20. The adjustability of the second shaft 26 is designed to fit the batter/instructor's preferences (e.g., preferred height for the ball 48 to be disposed, in use) and connects to the top light unit by means of the second shaft 26.

The top fiber optic light bundle of the light source 38 is designed to be installed on top of the base unit structure previously described. The contents of the fiber optic light bundle 38 are at least partially contained within a housing 40 (which may be formed from aluminum) or attached thereto. Disposed between the light bundle 38 and the base unit structure previously described are a fiber optic unit adapter 28, battery pack holder and battery assembly 30 retained within the fiber optic unit adapter 28, a printed programmable circuit board (PCB) 32 (which serves as a controller), and PCB housing 34. In certain embodiments, the battery pack holder and battery assembly 30 is removable from the fiber optic unit adapter 28 and may contain one or more batteries housed in a holder portion with a cap operable to insert and remove the batteries. For example, four AAA batteries may be used to supply the power to the PCB 32 and light source 38. The PCB 32 houses the program and the means to supply the LED random light flash. In certain embodiments, the housing 40 is removably engaged (such as screwably coupled) with the fiber optic unit adapter 28.

Figure 7:
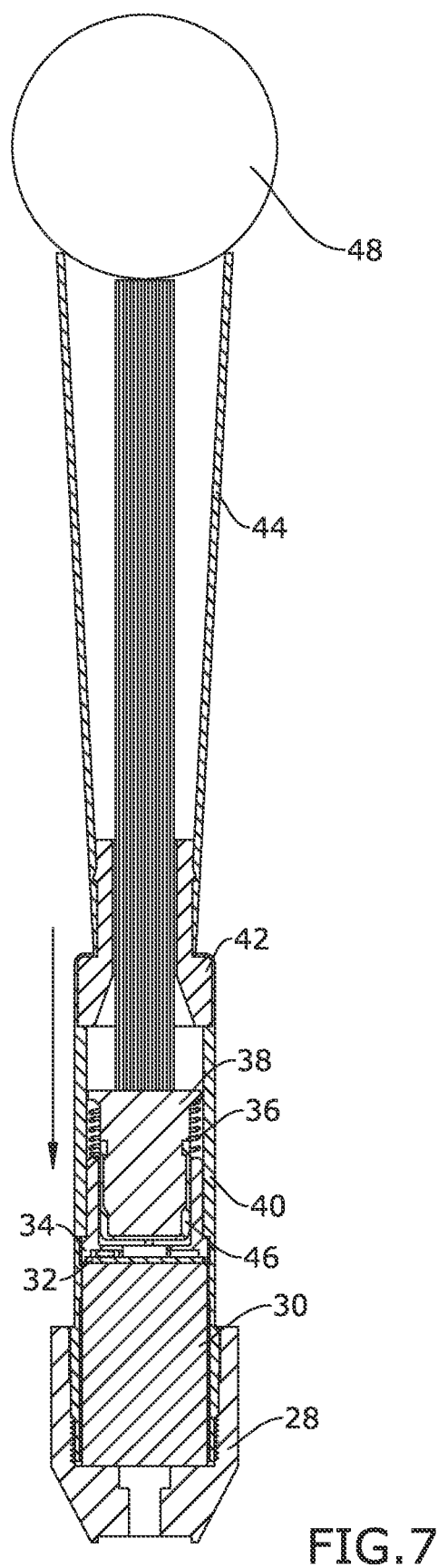
FIG. 7 is a section view of embodiment of the present invention, similar to FIG. 6, showing the light source being urged downwards upon placement of the ball on the embodiment.
Figure 8:
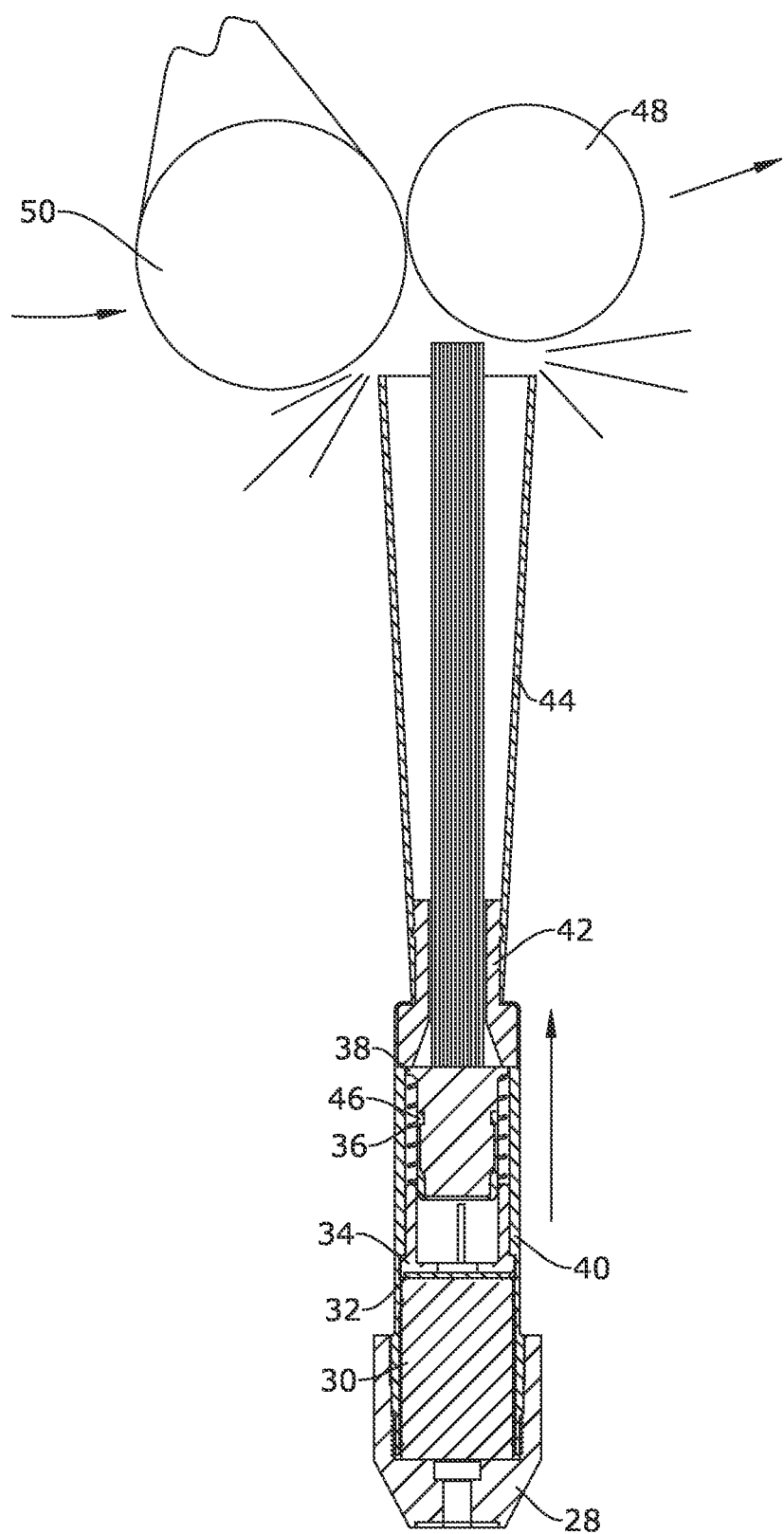
FIG. 8 is a section view of the embodiment of the present invention, in use, with a bat hitting the ball off the tee and the light source being biased upwards.

The PCB housing 34 contains the PCB 32 (i.e., a controller) that has the capability to emit multiple random light colors. This light source 38 and circuit board/PCB 32 is programmed to emit light, such as light emitting diode (LED) light, and transfer the multi-colored light from the circuit board through a series of small fiber optic cables bound together (top portion of the light bundle 38) to ultimately reach the immediate end of the fiber optic cables located in the area in contact with the ball 48, as shown in FIGS. 7 and 8.

Advantageously, the process to energize the light emitting program is initiated solely by a ball 48 pushing down the fiber optic cables of the light source 38. This action pushes the fiber optic cable downward which, via a metal contact sleeve 46, engages a set of metal contacts on the PCB 32 to start the program and will remain active until the ball 48 is hit or removed from a topper 44 (which may be formed as a one-piece molded rubber topper) of the tee. In certain embodiments, when the program is initiated, the light source 38 is not actually illuminated until the ball 48 is hit off the topper 44 (i.e., the spring action to push up the fiber optic cable also results in the program cycling the light on). In other embodiments, the light source 38 may be lit up once the light emitting program is initiated and remain on for a period of time after the ball 48 is hit off or removed from the tee (i.e., after the fiber optic cable has been pushed up by the spring action).

The topper 44 is connected to the rest of the tee via a topper attachment 42 to maintain the topper 44 in position relative to the housing 40. The downward action of the light source 38 starts/initiates and holds/pauses the program sequence by means of the metal sleeve 46 attached to the fiber optic cable (see bottom portion of light source 38), and two spring-loaded contacts housed on the PCB 32 (see upwardly extending arms on PCB 32). The PCB housing 34 not only houses the contacts and PCB 32, but also maintains the holding/loaded position for an actuating spring 36 (described in greater detail below) that sends the fiber optic bound cable of the light source 38 up with a fast recoil (movement from FIG. 7 position to FIG. 6 and FIG. 8 position) to emit the light as immediately as possible after the ball 48 is hit or removed from the topper 44.

The light source 38 not only is a conduit for the light, but also is the mechanical source that initiates the programmed sequence. The many small plastic individual fiber optic cables (top elements of the light source 38) are bound together for multiple purposes. The plurality of small cables may be bound together, for example, by melting one end (such as the top end) and attaching an additional plastic nut on the other end (such as the bottom end) proximal a bottom portion/mounting structure of the light source 38 to keep the bundle intact as well as keep the bundle from being able to be ejected free from the unit. This melted cable and nut are then further attached by another plastic nut that adds an additional holding force as well as the metal contact sleeve 46. As previously mentioned, the metal contact sleeve 46 is the source that electronically contacts the metal spring loaded contact poles on the PCB 32, as shown for example in FIG. 7, that initiates the circuit to energize the program sequence. The fiber optic cable's binding and coupling is designed to rest on the actuating spring 36. The actuating spring 36 holds the fiber optic bundle of the light source 38 to be normally maintained/loaded in the up position (FIG. 5).

The actuating spring 36 is designed with multiple purposes. It keeps the fiber optic bundle (and consequently, the metal contact sleeve 46) in the up position (FIG. 6) and when loaded with a ball 48, it compresses the actuating spring 36 (FIG. 7) to allow the mechanical action to start the electronic action and program. The spring 36 is specifically designed to compress precisely with the weight of a ball 48 (e.g., baseball or softball), and recoil upwards with an immediate and extremely fast speed after the ball 48 is hit with a bat 50 (as shown in FIG. 8) or removed for the purpose of turning the light on and off as quickly as possible within the programmed time frame.

The topper 44 may be a molded one-piece rubber unit designed to hold the ball 48 stable after loading, to protect the fiber optic cables of the light source 38 and set the proper depth such that the fiber optic cable is depressed from the loaded ball 48. The ball pushes the fiber optic bundle down to load and initiate the program sequence, and the rubber topper 44 also acts as a hard stop to locate the fiber optic bundle in the proper location to initiate the programmed sequence of operation.

In general, the framework of the batting tee may be constructed with heavy aluminum and metal to keep the mechanical properties as steady robust as possible for the purpose of the batter to be able to see and call out at least one color that the light source 38 displays once the ball 48 has been hit off the batting tee. The one or more color/light appears due to the fiber optic bundle of the light source 38 engaging the circuit to initiate the random program. This process happens almost instantaneously because of the precisely designed amount of spring tension within the spring 36 itself, as previously described.

Once the ball 48 is hit off, the PCB 32, in certain embodiments, activates one of a plurality (such as five) random color flashes for a programed amount of time. This programmed amount of time is also programable to add or decrease flash on-time, for example, from 100 ms to 1000 ms in increments of 100 ms. It will be appreciated by those with skill in the art that, from the foregoing disclosure, any number of colors may be included in a group that is selected from. It will be further appreciated that, in certain embodiments, multiple random colors (such as two or more) may be displayed by the fiber optic bundle simultaneously, as described above. Even further, it will also be appreciated that the amount of time the random color displays for may be varied even further than what is described, in accordance with the present invention. Finally, it will be appreciated that, while the controller has been described primarily in the context of being embodied as a PCB 32, other appropriate controllers may be selected in accordance with the present invention such that the functionality described herein is achieved.

In use, embodiments of the present invention give batters a state-of-the-art technological instantaneous feedback which allows them to keep their eyes within the bat 50 to ball 48 contact zone. Batters or instructors simply (1) add one or more batteries to the tee; (2) assemble the rest of the tee, as needed; (3) place the ball 48 on the topper 44 to engage the electrical components and initiate the program; and (4) using a bat 50, hit the ball 48, causing the fiber optic light bundle to move upwards and turn on for a programmed amount of time, thus serving as a visual marker for the batter to look at after swinging.

It should be understood, of course, that the foregoing relates to exemplary embodiments of the invention and that modifications may be made without departing from the spirit and scope of the invention as set forth in the following claims.

What is claimed is:

1. A batting tee comprising:
   a base;
   a vertical shaft assembly mounted to the base and having a ball support at an uppermost end;
   a light source housed within the vertical shaft assembly and configured to illuminate an area proximate the ball support, the light source not being illuminated until a ball is displaced from the ball support; and
   a controller for activating the light source,
   wherein a spring pushes up a fiber optic cable when the ball is displaced from the ball support and causes the turning on of the light source.

2. The batting tee of claim 1, wherein the controller activates the light source when a ball is displaced from the ball support.

3. The batting tee of claim 1, wherein the light source is movable relative to the vertical shaft assembly.

4. The batting tee of claim 1, wherein the vertical shaft assembly further comprises a spring that biases the light source towards an up position.

5. The batting tee of claim 1, wherein the light source further comprises a fiber optic light bundle at an uppermost portion thereof.

6. The batting tee of claim 1, wherein a contact sleeve is mounted to a bottommost end of the light source and configured to contact the controller to initiate a light emitting program when a ball is disposed on the ball support.

7. The batting tee of claim 1, wherein the light source comprises at least one randomly selected color.

8. The batting tee of claim 7, wherein the light source comprises a plurality of colors.

9. A method for improving batting technique comprising:
   providing a batting tee comprising:
   a base;

a vertical shaft assembly mounted to the base and having a ball support at an uppermost end;
a light source housed within the vertical shaft and configured to illuminate an area proximate the ball support, the light source not being illuminated until a ball is displaced from the ball support; and
a controller for activating the light source;
wherein a spring pushes up a fiber optic cable when the ball is displaced from the ball support and causes the turning on of the light source;
placing a ball on the ball support of the tee;
hitting the ball off the ball support to activate the light source; and
keeping eye contact with the illuminated area.

* * * * *